(12) United States Patent
Singh et al.

(10) Patent No.: US 10,360,031 B2
(45) Date of Patent: Jul. 23, 2019

(54) FAST UNALIGNED MEMORY ACCESS

(75) Inventors: Mandeep Singh, Union City, CA (US);
Mohammad Abdallah, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 926 days.

(21) Appl. No.: 14/376,825

(22) PCT Filed: Oct. 21, 2011

(86) PCT No.: PCT/US2011/057380
§ 371 (c)(1),
(2), (4) Date: May 19, 2015

(87) PCT Pub. No.: WO2013/058775
PCT Pub. Date: Apr. 25, 2013

(65) Prior Publication Data
US 2015/0248294 A1 Sep. 3, 2015

(51) Int. Cl.
*G06F 9/30* (2018.01)
*G06F 9/34* (2018.01)
(Continued)

(52) U.S. Cl.
CPC ............ *G06F 9/30043* (2013.01); *G06F 9/34* (2013.01); *G06F 9/3834* (2013.01);
(Continued)

(58) Field of Classification Search
CPC ...... G06F 9/30043; G06F 9/34; G06F 9/3834; G06F 12/0888; G06F 13/1642; G06F 2212/6046
See application file for complete search history.

(56) References Cited

U.S. PATENT DOCUMENTS 5,878,245 A * 3/1999 Johnson .............. G06F 9/30043
711/131
6,499,044 B1 * 12/2002 Brooks ..................... G06F 7/49
708/205
(Continued)

OTHER PUBLICATIONS

International Preliminary Report on Patentability for Application No. PCT/US2011/057380, dated May 1, 2014, 7 pages.
(Continued)

*Primary Examiner* — Mano Padmanabhan
*Assistant Examiner* — William E. Baughman
(74) *Attorney, Agent, or Firm* — NDWE, LLP

(57) ABSTRACT

Fast unaligned memory access. In accordance with a first embodiment of the present invention, a computing device includes a load queue memory structure configured to queue load operations and a store queue memory structure configured to queue store operations. The computing device includes also includes at least one bit configured to indicate the presence of an unaligned address component for an entry of said load queue memory structure, and at least one bit configured to indicate the presence of an unaligned address component for an entry of said store queue memory structure. The load queue memory may also include memory configured to indicate data forwarding of an unaligned address component from said store queue memory structure to said load queue memory structure.

20 Claims, 5 Drawing Sheets

(51) Int. Cl.
*G06F 9/38* (2018.01)
*G06F 13/16* (2006.01)
*G06F 12/0888* (2016.01)

(52) U.S. Cl.
CPC ...... *G06F 12/0888* (2013.01); *G06F 13/1642* (2013.01); *G06F 2212/6046* (2013.01)

(56) References Cited

U.S. PATENT DOCUMENTS

| | | | | |
|---|---|---|---|---|
| 7,310,706 B1* | 12/2007 | Stribaek | ............. | G06F 12/0802 |
| | | | | 711/126 |
| 7,418,552 B2 | 8/2008 | Akkary et al. | | |
| 7,640,414 B2 | 12/2009 | Cox et al. | | |
| 8,195,919 B1* | 6/2012 | Olson | ................. | G06F 12/0842 |
| | | | | 711/2 |
| 2006/0036817 A1* | 2/2006 | Oza | ...................... | G06F 9/3816 |
| | | | | 711/155 |
| 2006/0184738 A1* | 8/2006 | Bridges | .............. | G06F 9/30043 |
| | | | | 711/125 |
| 2006/0184777 A1* | 8/2006 | Mericas | ................ | G06F 9/3017 |
| | | | | 712/227 |
| 2010/0145969 A1 | 6/2010 | Wang et al. | | |
| 2011/0040906 A1 | 2/2011 | Chung et al. | | |
| 2011/0202704 A1* | 8/2011 | Seo | .................... | G06F 13/1673 |
| | | | | 711/5 |
| 2013/0073784 A1* | 3/2013 | Ng | .................... | G06F 12/0246 |
| | | | | 711/103 |

OTHER PUBLICATIONS

International Search Report and Written Opinion for Application No. PCT/US2011/057380, dated Jul. 31, 2012, 8 pages.

* cited by examiner

Compare Address 'X' And 'X+1'
With Incoming Address Y

Stored Address = X is unaligned
Stored Components of X = G1, G0 and $PSG_1$, $PSG_0$ — 410

Address X   = 01100101 11010010 11010111 11111111
Address X+1 = 01100101 11010010 11011000 00000000 — 415
Address Y   = 01100101 11010010 11011000 00000000
                                                  — 420

*Components:*
1. Compare X, Y
2. Compare $PSG_{1-X}$ and $PSG_{0-Y}$
3. Compare $GE_{1-X}$ and $GE_{0-Y}$
4. Compare $G2_X$, $G3_X$ and $G2_Y$ and $G3_Y$

*Component Compare Results:*

1. Compare X,Y

2. Compare $PSG_{1-X}$ and $PSG_{0-Y}$

3. Compare $GE_{1-X}$ and $GE_{0-Y}$

⎤
⎥ Unaligned
⎥ Component
⎥ Match

4. Compare $G2_X$, $G3_X$ and $G2_Y$, $G3_Y$

Unaligned Address (x+1) Generation From The Stored Address

Address X = 01100101 11010010 11010111 11111111
           G3       G2       G1       G0

GE₁ = 0010

PSG₁ = G1 + 1 = 11011000

Required Address X+1= 01100101 11010010 11011000 00000000

*LOGIC*

GE₁ = 0010            Mux Select = {GE₁,GE₁₋MASK}₃ ... {GE1, GE1-MASK}₀
GE₁ Mask = 0011

X+1= 01100101 11010010 11011000 00000000

FAST UNALIGNED MEMORY ACCESS

CROSS-REFERENCE TO RELATED APPLICATIONS

This application is a national stage of International Application No. PCT/US2011/057380, filed Oct. 21, 2011, which is hereby incorporated by reference.

FIELD OF INVENTION

Embodiments of the present invention relate to the field of processor design. More specifically, embodiments of the present invention relate to systems and methods for fast unaligned memory access.

BACKGROUND

The term unaligned memory access is generally used to refer to or to describe memory requests that require a memory, e.g., a cache memory, to return data that is not aligned to its read boundaries. For example, if a cache memory is aligned to word boundaries, e.g., 64-bit words, or the data path from a cache to the Load Store Queue (LSQ) is aligned along word boundaries from a cache line, a request for data that crosses this alignment is considered to be unaligned.

FIG. 1 illustrates a memory aligned to 64-bit word boundaries, in accordance with the convention art. For example, the first 64-bit word is aligned at address 0x000000. The second 64-bit word is aligned at address 0x000008. The third 64-bit word is aligned at address 0x000010.

A request made to address 0x000006 for 32 bits of data, will generally produce 16 bits of data from the entry addressed 0x000008 and the upper 16 bits of data from the entry addressed 0x000010. Such an unaligned access generally requires two memory accesses to fulfill one load request. It is to be appreciated that unaligned memory accesses generally decrease processor performance.

An additional problem with unaligned memory accesses occurs when a data bypass is required in a Load Store Queue (LSQ). When a load instruction (LD) is encountered, the cache is accessed and space is allocated in the Load Store Queue (LSQ) to install the data returned by cache. The load instruction resides in the Load Store Queue (LSQ) until the point at which the data that was requested is consumed.

This data may come from a cache, or it may be allowed to bypass from a store instruction (SD) which writes to the same address. The stores follow a similar path to cache where they are first logged into the Load Store Queue (LSQ) and then moved to the cache at instruction retirement. A store instruction that is older than a load instruction may bypass data to that load instruction, provided that the addresses match.

If one of these memory access instructions is unaligned, it is generally necessary to compare not only the aligned component but also the address to the next, or sequential aligned address, in order to determine a match. If only one instruction is unaligned, three addresses need to be compared. For example, one address for the aligned instruction and two addresses for the unaligned instruction must be compared. If both the instructions are unaligned, as many as four addresses may need to be compared, e.g., two addresses for the load instruction compared with each of the two addresses for the store instruction.

Conventional art approaches to mitigate such problems have included letting unaligned stores retire to cache before forwarding, generating exceptions to let software deal with the misalignment, and storing all possible addresses for each instruction. Unfortunately, such conventional approaches are prohibitively expensive and undesirable, in consideration of both degraded performance and deleteriously increased integrated circuit area. In addition, storing all the addresses for unaligned instructions generally requires two entries for each load/store (LD/SD) instruction pair in the Load Store Queue. A need for storing such addresses limits how many loads or stores can be in flight at the same time.

SUMMARY OF THE INVENTION

Therefore, what is needed are systems and methods for fast unaligned memory access. What is additionally needed are systems and methods for fast unaligned memory access that result in a minimal increase in integrated circuit die area. A further need exists for systems and methods for fast unaligned memory access that are compatible and complementary with existing systems and methods for processor design, programming and operation. Embodiments of the present invention provide these advantages.

In accordance with a first embodiment of the present invention, a computing device includes a load queue memory structure configured to queue load operations and a store queue memory structure configured to queue store operations. The computing device includes also includes at least one bit configured to indicate the presence of an unaligned address component for an entry of said load queue memory structure, and at least one bit configured to indicate the presence of an unaligned address component for an entry of said store queue memory structure. The load queue memory may also include memory configured to indicate data forwarding of an unaligned address component from said store queue memory structure to said load queue memory structure.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings are not drawn to scale.

FIG. 4 illustrates comparison of aligned and unaligned address components, in accordance with embodiments of the present invention.

DETAILED DESCRIPTION

Figure 1:
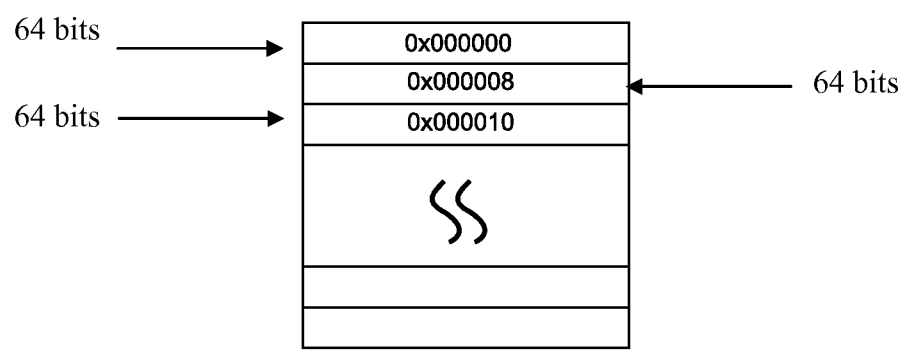
FIG. 1 illustrates a memory, e.g., a cache memory, aligned to 64-bit word boundaries, in accordance with the convention art.

Reference will now be made in detail to various embodiments of the invention, fast unaligned memory access, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that may be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "performing" or "generating" or "adjusting" or "creating" or "executing" or "continuing" or "indexing" or "processing" or "computing" or "translating" or "calculating" or "determining" or "measuring" or "gathering" or "running" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Fast Unaligned Memory Access

Embodiments in accordance with the present invention are well-suited to addressing various types and levels of memory in a computer system memory hierarchy. Many of the exemplary embodiments presented herein describe or refer to a cache memory, as cache memories may benefit from the performance advantages of embodiments in accordance with the present invention. It is to be appreciated that such examples are not intended to be limiting, and those of ordinary skill in the art will be able to envision how to extend the disclosures presented herein to other memory types and structures, and that all such embodiments are considered within the scope of the present invention.

In accordance with embodiments of the present invention, unaligned access processing starts as soon as the address for a load or store operation is resolved in the execution unit. Each unaligned access is treated as two memory accesses while considering them a singular entity for all other purposes. This approach requires having the components that completely describe the unaligned (address+1) component of the address at all times, so that it may be recreated when required.

Figure 2:
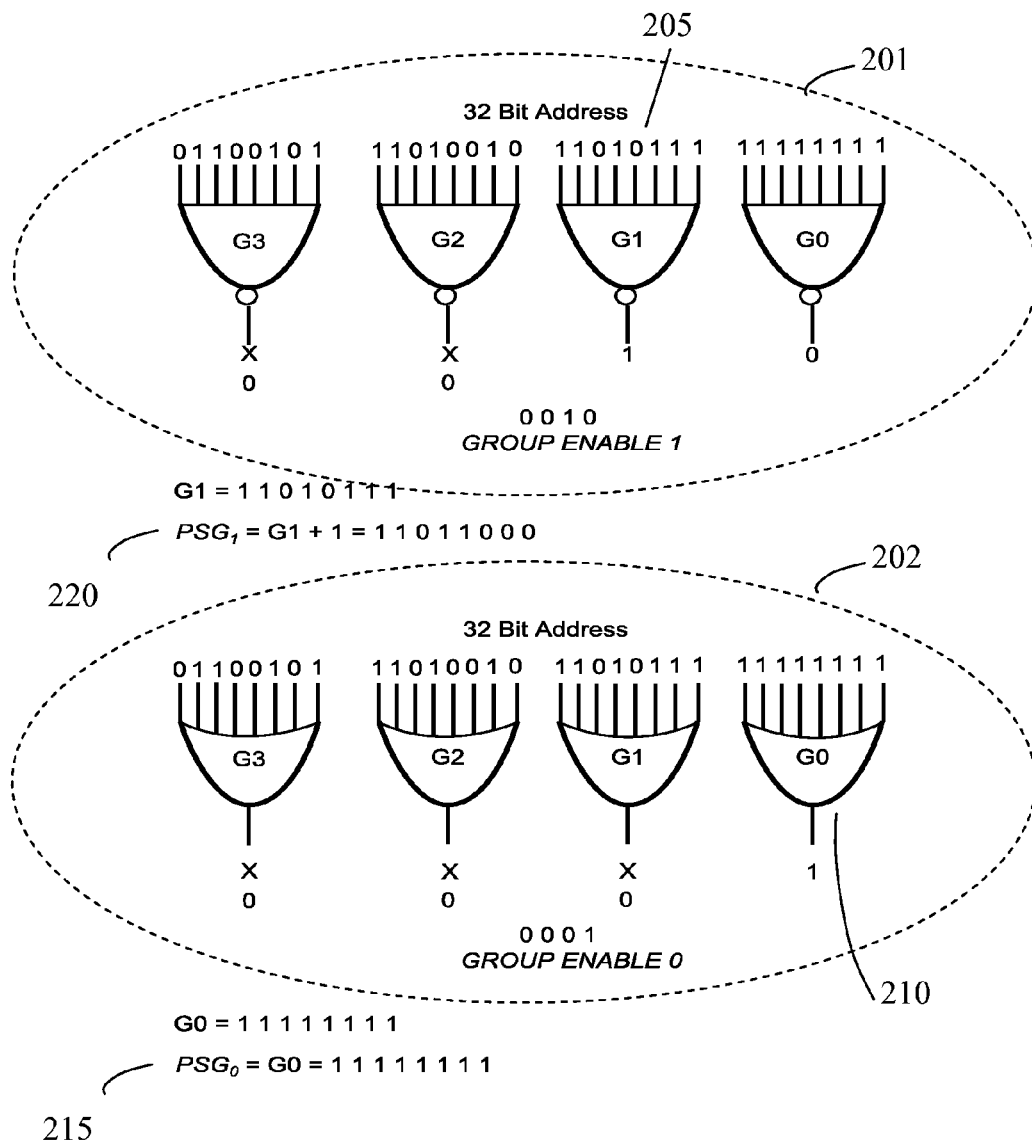
FIG. 2 illustrates the generation of exemplary Group Enable data patterns.

FIG. 2 illustrates the generation of exemplary Group Enable 1 (201) and exemplary Group Enable 0 (202) data patterns. Group Enable 1 (201) and exemplary Group Enable 0 (202) describe an address and its unaligned component, in accordance with embodiments of the present invention.

The generation of the unaligned component of an address requires incrementing that address to the next sequential aligned address. The increment operation involves adding a one (1) along the alignment boundary. For example, if each address points to a 64-bit data segment, then determining the next sequential address is equivalent to adding a 1 starting at bit 3 of the address, ignoring bits 0-2, if the machine is byte addressable.

When this addition is carried out, the carry propagation stops at the first occurrence of a '0' bit, after which point the address bits of this new unaligned address match the bits of the original aligned address. Addition of the circuitry of a 32-bit increment function, or a full adder, within memory access circuitry is disadvantageous in terms of the performance degradation associated with such functions, as well as the large integrated circuit die area required to implement such functions. The latency involved in performing the increment is also deleterious due the 31-bit carry propagation chain.

In order to create the unaligned address quickly, e.g., within a memory access cycle, and without using a 32-bit increment function, or a full adder, it should be determined where the carry propagation stops. It is to be appreciated that the bits to the right of this point, towards the least significant bit (LSB), will be all zero and the bits to the left of this point, towards the most significant bit (MSB), will all match the original address.

Embodiments in accordance with the present invention consider the address as a group of four bytes and stores information that identifies which byte the carry propagation stopped in. Accordingly, a "Group Enable" may be described as a four bit value, with each bit representing a group of eight bits. The bit that is set to '1' points to the group of eight bits where the carry propagation stopped. Group Enable 1 (201) in FIG. 2 illustrates one logical technique of how this can be accomplished using simple eight-input NAND gates, in accordance with embodiments of the present invention.

In the example of FIG. 2, the 32 bit address is 01100101110100101101011111111111 (0x65D2D7FF). Proceeding from the lowest bit, the first zero occurs in the second group of 8 bits, referred to as Group 1 (205). Accordingly, the second bit of Group Enable 0 (201), corresponding to Group 1 (205), is set to 1, and the complete Group Enable 0 (201) is "0010."

FIG. 2 further illustrates the generation of Group Enable 0 (202). Group Enable 0 (202) is described further below. In summary, the Group Enable 0 (202) is a Group Enable that would have been generated had a Group Enable been generated for the address pointing to the previous 64 bits of data.

Consider the address space shown in FIG. 1. For the address 0x000008, a Group Enable 1 would represent the group enable if we increment the address 0x000008. A Group Enable 0 in turn would signify the Group Enable 1 for address 0x000000; which is the increment that was needed to get to address 0x000008.

To generate Group Enable 0 (202) the circuit requires finding where the carry propagation stopped for this address. This is identified by the first occurrence of a '1' bit. All zeros in a group will signify that the carry from the previous addition propagated all the way through the group. If a group contains any set bit, the carry could not have propagated any further.

In the exemplary embodiment of FIG. 2, the first 1 bit is the first (lowest order) bit of the address. Accordingly, Group 0 (210) contains the first 1 bit, and the Group enable 0 (202) is "0001."

In this address, divided into four one-byte sets, once it is incremented there are three distinct regions that can be separately processed.

Group(s) through which the carry completely propagated,
Group at which the carry propagation stopped, and
Group(s) not affected by the carry propagation.

All group(s) through which the carry completely propagated will be all zeros since the carry propagation reset all the bits. Group(s) not affected by the carry propagation will completely match the original address from which the unaligned address is generated since such Group(s) are unaffected and the carry did not propagate this far into the address, e.g., into these Group(s).

The remaining group, at which the carry propagation stopped, will be different from the original address and to compare/generate this part of the address we store this part as a Partial Sum Group (PSG) data pattern. FIG. 2 illustrates the generation of Partial Sum Group 0 (215) and Partial Sum Group 1 (220) data patterns. Partial Sum Group 1 (220) in the example of FIG. 2 is an incremented version of the group (G1 205) in which the carry propagation would have stopped. Adding 1 to G1 205 of the address results in Partial Sum Group 1 (220).

Partial Sum Group 0 (215) is a data pattern representing the result of the group where the carry propagation would have stopped responsive to generating the present address as an unaligned component of the address of the previous 64 bits as described for Group Enable generation in the previous subsection. Partial Sum Group 0 (215) is therefore the bits of the group indicated to by Group Enable 0 (202) as being the propagation stop point.

Figure 3:
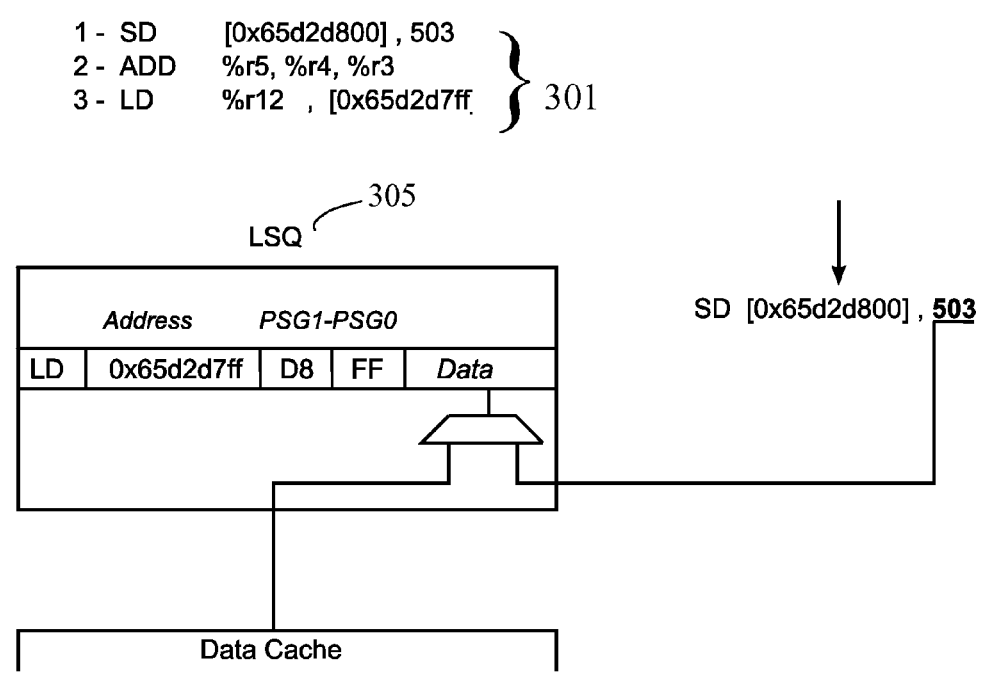
FIG. 3 illustrates a program segment to illustrate unaligned forwarding, in accordance with embodiments of the present invention.

FIG. 3 illustrates a program segment 301 to illustrate unaligned forwarding, in accordance with embodiments of the present invention. Consider that a load instruction is issued and it resides in the Load Store Queue (LSQ) waiting for data arrival from the cache hierarchy or updated data from an older store instruction. The machine in consideration is an Out of Order (OOO) issue machine. Accordingly, an older store instruction can arrive later than a younger load instruction to the Load Store Queue (LSQ). If the store instruction and the load instruction have the same address, the store instruction updating this address and the load instruction loading from the address, being that the store instruction is older in program age order, the store instruction should be allowed to forward data to the load instruction after confirming that the addresses match.

The load instruction residing in the Load Store Queue (LSQ) 305 is an unaligned load instruction and it has available to it its aligned component of the address, the PSG0 and PSG1 bits and it can quickly generate its Group Enable 0 and Group Enable 1 through the mechanism already described (FIG. 2). The aligned store instruction arrives with its aligned address component, PSG0 and PSG1 with the ability to quickly generate Group Enable 0 and Group Enable 1.

FIG. 4 illustrates comparison of aligned and unaligned address components, in accordance with embodiments of the present invention. Address X 410 represents the aligned component of the address. Address X+1 415 represents the unaligned address component of the load instruction address and address Y 420 represents the store instruction address. Observe that the unaligned address component of the load instruction, as setup in the figure, is the component that creates a forwarding match with the store instruction (address Y 3420). This unaligned address component is not stored in the Load Store Queue 305 (FIG. 3) but its PSG components are available. When the store instruction arrives, the content addressable memory (CAM) match of its address does not create a direct match with the load instruction address because the lower order 12 bits create a mismatch.

The example in FIG. 4 illustrates the extra components required above the already present 32-bit address that is compared when the store instruction arrives to a Load Store Queue, e.g., Load Store Queue 305 (FIG. 3). Instead of creating and comparing the unaligned address as well, this implementation compares the 8-bit PSG values, generates and compares the four bit Group Enable values and then multiplexes the already compared content addressable memory results of the groups towards the left of the PSG.

Since the lower 12 bits of the aligned load instruction address and the aligned store instruction address create a mismatch, the hardware, through an unaligned bit, is aware that load instruction has an unaligned component that needs to be compared with the store instruction address. For this purpose the implementation considers the three parts of the address explained in section 2.1.2, the group of bits unmodified after the increment, the incremented group and the zero group.

To recognize the point of division of the three components the hardware first compares the Group Enable as shown in FIG. 4. Since the unaligned component of the load instruction is to be compared with the aligned component of the store instruction, Group Enable 1 is used as the group enable that describes the division point for the unaligned address load instruction and Group Enable 0 is used for the store instruction since it is the aligned component of the store instruction that needs to be compared. The Group Enable represents the point of division when the address is incremented. The group for which the Group Enable bit is set is the group that has the incremented 8 bits and is group G1 for the example presented. To the right of this group (G0) are all '0' bits and to the left of this group (G2, G3), the upper 16 bits match the original address exactly. For the store instruction, Group Enable 0, which represents its group division as incremented from its previous sequential address, describes its current address. Therefore, the hardware chooses to compare Group Enable 0 of the store instruction with the Group Enable 1 of the load instruction, which describes the address we don't have stored.

Group Enable only forms part of the compare, which, if it matches, confirms that the carry propagation stopped in the same group for both addresses. Next the group where this propagation stopped in its entirety is compared. For this purpose the implementation compares PSG1 from the load instruction and PSG0 from the store instruction for the same reasons that the appropriate Group Enable's were chosen.

Once these produce a match the result of the compare of the upper 16 bits of the address, which already produced a match when the original addresses were compared, is ANDed with these results to produce an unaligned match result.

This implementation is able to achieve this result without the need to generate and save a second 32 bit address. The granularity of the groups that the address is divided into (bytes in this example) can be modified if need requires an architecture to store smaller PSG components. The compare hardware is also simplified by avoiding a second 32 bit comparator.

Three cases need to be handled in the Load Store Queue (LSQ) if it allows for data bypassing between loads and stores. The three cases are:
1. Aligned compare requiring 1 address comparison,
2. Unaligned load instruction/store instruction comparing against an aligned store instruction/load instruction, requiring 2 compares, 1 for the aligned address and 1 for the unaligned address, and
3. Unaligned load instruction/store instruction comparing against an unaligned store instruction/load instruction requiring 3 compares, 1 for the aligned components, 1 for the unaligned component of the first instruction with the aligned part of the second and 1 for the reverse case.

Case 1 is a conventionally aligned address. It is appreciated that memory circuitry and accesses should be able to handle aligned addresses. Case 2 has been discussed in detail for this implementation. Case 3 is a derivation of case 2. With the components described in the previous sections case 3 is also handled without the need for extra component generation or extra storage. An example of this case is an unaligned load instruction comparing against an unaligned store instruction. Both represent two addresses, load address aligned portion ($LA_{AL}$), load address unaligned portion ($LA_{UL}$) and store address aligned portion ($SA_{AL}$), store address unaligned portion ($SA_{UL}$). The following are the matches that need to be conducted and the components that are utilized for those compares.
1. $LA_{AL} = SA_{AL}$. If this match is true, it's implied that the unaligned address components also match. This required nothing but the complete 32 bit address match for the original addresses.
2. $LA_{AL} = SA_{UL}$. This requires PSG0 from the load address and Group Enable 0 from the load address to compare against PSG1 and Group Enable 1 of the store address.
3. $LA_{UL} = SA_{AL}$. This requires PSG1 from the load address and Group Enable 1 from the load address to compare against PSG0 and Group Enable 0 of the store address.

This covers all the cases that would be required for the Load Store Queue (LSQ), e.g., load store queue 305 of FIG. 3, to implement to support unaligned instructions completely in the module without instruction re-issue.

Figure 5:
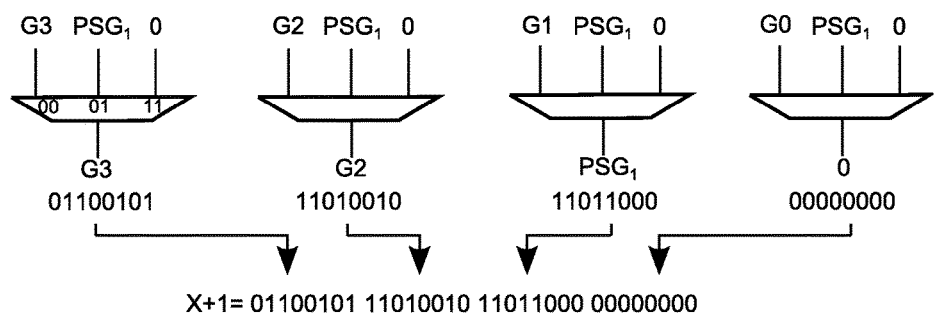
FIG. 5 describes the generation of a 32-bit unaligned address to address the cache, in accordance with embodiments of the present invention.

FIG. 5 describes the generation of a 32-bit unaligned address to address the cache, from the aligned address stored in the Load Store Queue (LSQ), in accordance with embodiments of the present invention.

Embodiments in accordance with the present invention provide systems and methods for fast unaligned memory access. Embodiments in accordance with the present invention also provide for systems and methods for fast unaligned memory access that result in a minimal increase in integrated circuit die area. Further, embodiments in accordance with the present invention provide for systems and methods for fast unaligned memory access that are compatible and complementary with existing systems and methods for processor design, programming and operation.

Various embodiments of the invention are thus described. While the present invention has been described in particular embodiments, it should be appreciated that the invention should not be construed as limited by such embodiments, but rather construed according to the below claims.

What is claimed is:

1. A computing device comprising:
   a load queue memory structure configured to store a load operation in a load queue entry; and
   a store queue memory structure configured to store a store operation in a store queue entry,
   wherein the load queue entry includes at least one bit configured to indicate the presence of an unaligned address in the load queue entry and a location of an unaligned address component in the unaligned address, where an unaligned address is an address that is not aligned with a read boundary of a memory of the computing device, and
   wherein the store queue entry includes at least one bit configured to indicate the presence of an unaligned address in the store queue entry.

2. The computing device of claim 1 wherein the load queue entry is configured store a first partial sum group for the load operation that provides an incremented value of the unaligned address component.

3. The computing device of claim 2 wherein the load queue entry is configured to store a second partial sum group for the load operation that is a set of bits of a group in the unaligned address in which a carry propagation stops to generate an aligned address from the unaligned address.

4. The computing device of claim 1 wherein the store queue entry is configured to store a first partial sum group.

5. The computing device of claim 4 wherein the store queue entry is configured to store a second partial sum group.

6. The computing device of claim 1 wherein said load queue memory structure is configured to indicate data forwarding of an aligned address component from the store queue memory structure to the load queue memory structure.

7. The computing device of claim 1 wherein the load queue memory structure is configured to indicate data forwarding of an unaligned address component from said store queue memory structure to said load queue memory structure.

8. A operation queue to store a set of operations comprising:
   at least one storage entry to store an operation, the at least one storage entry to store an unaligned address and address descriptors, the address descriptors including a set of bits of a group in the unaligned address in which a carry propagation stops to generate an aligned address from the unaligned address; and
   a first circuit coupled to the at least one storage entry configured to compare the unaligned address in the at least one storage entry to an external address in a single full address comparison.

9. The operation queue of claim 8 further comprising:
   a second circuit coupled to the at least one storage entry, the second circuit configured to compare the address descriptors in the at least one storage entry with external address descriptors in parallel with the comparison of the unaligned address.

10. The operation queue of claim 9 further comprising:
a third circuit configured to identify a match among corresponding address descriptors.

11. The operation queue of claim 10 further comprising:
a fourth circuit configured to increment a full address in the at least one storage entry responsive to the match.

12. The operation queue of claim 9 wherein the second circuit configured to compare the address descriptors compares fewer bits than comprise a full address for a computer system.

13. The operation queue of claim 8 further comprising:
a fifth circuit configured to generate a next address for the unaligned address faster than an increment operation performed by a full adder.

14. A computing device comprising:
a load queue memory structure configured to queue load operations; and
wherein said load queue memory structure is further configured to store unaligned addresses in a single line of said load queue memory structure along with an indicator of the unaligned address and a location of an unaligned address component in the unaligned address, where an unaligned address is an address that is not aligned with a read boundary of a memory of the computing device.

15. The computing device of claim 14 further configured so that only one address for said unaligned address is stored in said single line of said load queue memory structure.

16. The computing device of claim 14 further comprising a store queue memory structure configured to queue store operations.

17. The computing device of claim 16 wherein said store queue memory structure is further configured to store unaligned addresses in a single line of said load queue memory structure.

18. The computing device of claim 17 further configured so that only one address for said unaligned address is stored in said single line of said store queue memory structure.

19. The computing device of claim 18 wherein said load queue memory structure further comprises memory configured to indicate data forwarding of an aligned address component from said store queue memory structure to said load queue memory structure.

20. The computing device of claim 19 wherein said load queue memory structure further comprises memory configured to indicate data forwarding of an unaligned address component from said store queue memory structure to said load queue memory structure.

* * * * *